US012458549B2

(12) United States Patent
Cheng

(10) Patent No.: US 12,458,549 B2
(45) Date of Patent: Nov. 4, 2025

(54) CALF REST AND SUPPORT STRUCTURE OF WHEELCHAIR

(71) Applicant: MERITS HEALTH PRODUCTS CO., LTD., Taichung (TW)

(72) Inventor: Ming-Chuan Cheng, Taichung (TW)

(73) Assignee: MERITS HEALTH PRODUCTS CO., LTD., Taichung (TW)

( * ) Notice: Subject to any disclaimer, the term of this patent is extended or adjusted under 35 U.S.C. 154(b) by 332 days.

(21) Appl. No.: 18/337,653

(22) Filed: Jun. 20, 2023

(65) Prior Publication Data

US 2024/0350336 A1 Oct. 24, 2024

(30) Foreign Application Priority Data

Apr. 18, 2023 (TW) ................................ 112114347

(51) Int. Cl.
*A61G 5/12* (2006.01)

(52) U.S. Cl.
CPC .................................. *A61G 5/127* (2016.11)

(58) Field of Classification Search
None
See application file for complete search history.

(56) References Cited

U.S. PATENT DOCUMENTS 531,330 A * 12/1894 Potter .................... A61G 5/023 280/211
2,694,437 A * 11/1954 Glaser .................... A61G 5/006 5/81.1 R
2,793,682 A * 5/1957 Duke ..................... A61G 5/128 297/375
3,072,437 A * 1/1963 Shea ........................ A61G 5/12 297/423.32
4,358,125 A * 11/1982 Charles .................. A61G 5/128 297/411.27
4,763,951 A * 8/1988 Silverman ........... B29C 33/3878 297/452.28
4,981,305 A * 1/1991 Lockard ................. A61G 5/128 280/42
5,263,728 A * 11/1993 Patel ........................ A61G 5/08 280/42
5,522,644 A * 6/1996 Peek ...................... A47C 7/503 297/423.37
6,220,616 B1 * 4/2001 Finch ..................... A61G 5/125 297/411.32
6,273,443 B1 * 8/2001 Fleigle ................... A61G 5/127 280/250.1
6,769,705 B1 * 8/2004 Schlangen ............... A61G 5/08 280/250.1

(Continued)

*Primary Examiner* — David R Dunn
*Assistant Examiner* — Christopher E Veraa
(74) *Attorney, Agent, or Firm* — Muncy, Geissler, Olds & Lowe, P.C.

(57) ABSTRACT

A calf rest and support structure of a wheelchair includes a rail, an adjusting and moving set movably disposed to the rail, a first swing member pivotally connected with the adjusting and moving set and having a first curved groove and a third pivot hole, a lock bolt secured to the adjusting and moving set through the first curved groove of the first swing member, a second swing member pivotally connected with the third pivot hole of the first swing member so as to be swung relative to the first swing member, and a calf support member fixed to the second swing member.

10 Claims, 12 Drawing Sheets

(56) References Cited

U.S. PATENT DOCUMENTS

| | | | | |
|---|---|---|---|---|
| 6,866,341 | B2 * | 3/2005 | Behnert | B60N 3/063 297/423.26 |
| 7,360,840 | B2 * | 4/2008 | Barlow | A61G 5/127 297/423.26 |
| 11,628,107 | B1 * | 4/2023 | Reznikov | A61G 5/127 280/291 |
| 2003/0075966 | A1 * | 4/2003 | Behnert | B64D 11/0643 297/423.26 |
| 2003/0075967 | A1 * | 4/2003 | Ciolfe | A61G 5/128 297/423.32 |
| 2005/0077701 | A1 * | 4/2005 | Barlow | A61G 5/127 280/304.1 |
| 2005/0212255 | A1 * | 9/2005 | Jansen | A61G 5/12 280/304.1 |
| 2016/0000227 | A1 * | 1/2016 | Kim | B64D 11/0643 297/423.26 |
| 2019/0038487 | A1 * | 2/2019 | Cherny | A61G 5/127 |
| 2024/0350336 | A1 * | 10/2024 | Cheng | A61G 5/128 |

* cited by examiner

CALF REST AND SUPPORT STRUCTURE OF WHEELCHAIR

BACKGROUND OF THE INVENTION

1. Field of the Invention

The present invention relates to a wheelchair and more particularly, to a calf rest and support structure of the wheelchair.

2. Description of the Related Art

Although some of a known calf rest and support structure of a wheelchair have a function of swing adjustment, some of them are too complicated in structure, and some of them are adjusted unsmoothly, and some of them are unable to be adjusted to a desired state. Therefore, it needs to be improved.

SUMMARY OF THE INVENTION

It is a primary objective of the present invention to provide a calf rest and support structure of a wheelchair, which is convenient to adjust position and angle, and easy to move and swing.

To attain the above objective, the calf rest and support structure of the wheelchair of the present invention comprises a rail, an adjusting and moving set movably disposed to the rail, a first swing member pivotally connected with the adjusting and moving set and having a first curved groove and a third pivot hole, a lock bolt secured to the adjusting and moving set through the first curved groove of the first swing member, a second swing member pivotally connected with the third pivot hole of the first swing member so as to be swung relative to the first swing member, and a calf support member fixed to the second swing member.

It can be seen from the above that the first and second swing members are configured to be swingable and adjustable, such that the calf rest and support structure of the present invention is convenient to adjust position and angle and easy to move and swing, thereby enhancing convenience of adjustment and use.

Preferably, the present invention further comprises a stop wheel disposed to the second swing member for rest of the first swing member.

Preferably, the first swing member has a wheel stop recess. The stop wheel leans against the wheel stop recess.

Preferably, the second swing member has a fourth pivot hole and a second curved groove formed with a center of the fourth pivot hole as a circle center, the fourth pivot hole pivotally connected with the third pivot hole. The stop wheel is disposed to the second curved groove of the second swing member.

Preferably, the adjusting and moving set has a first clamping and moving member and a second clamping and moving member. The first and second clamping and moving members are clamped on the rail and moved along the rail.

Preferably, the first clamping and moving member has a first slide groove slidably disposed to the rail. The second clamping and moving member has a second slide groove slidably disposed to the rail.

Preferably, the first clamping and moving member and the first swing member are secured together by the lock bolt penetrated through the first curved groove of the first swing member and a fixed through hole of the first clamping and moving member, and threaded with a fixed threaded hole of the second clamping and moving member.

Preferably, the calf support member has a fixed board portion connected with the second swing member.

Preferably, the second swing member has an elongated hole for adjusting and fixing the calf support member in different positions.

Preferably, the present invention further comprises a second pivot set pivotally connected with the first and second swing members, the second swing member has a fourth pivot hole. The second pivot set has a first pivot barrel pivotally connected with the third pivot hole, a second pivot barrel connected with the fourth pivot hole, a first washer located between the first and second pivot barrels, a second washer located at an end portion of the second pivot barrel, and a socket bolt threaded with the first pivot barrel.

Other advantages and features of the present invention will be fully understood by reference to the following specification in conjunction with the accompanying drawings, in which like reference signs denote like components of structure.

DETAILED DESCRIPTION OF THE INVENTION

Figure 1:
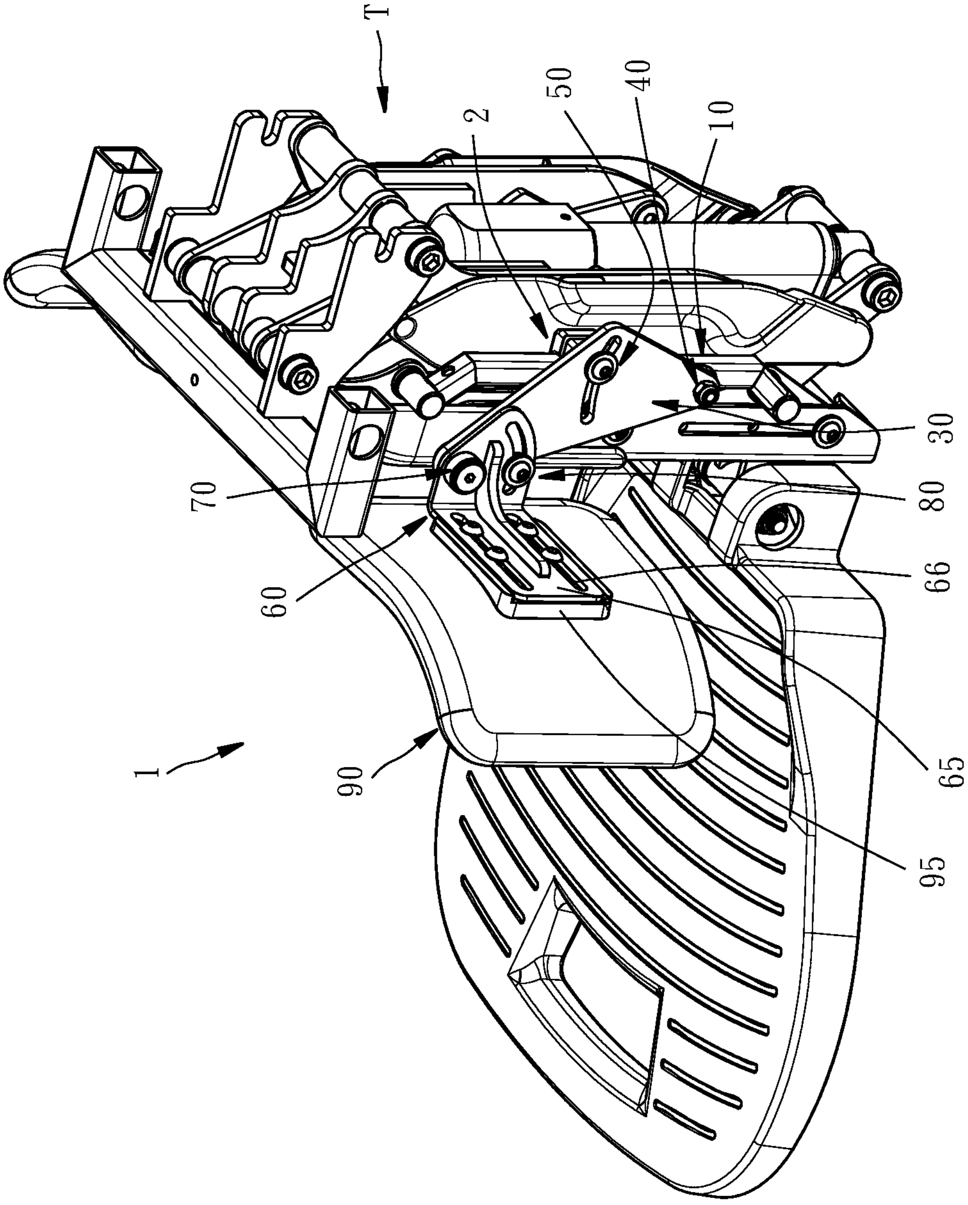
FIG. 1 is a perspective view of a preferred embodiment of the present invention.
Figure 2:
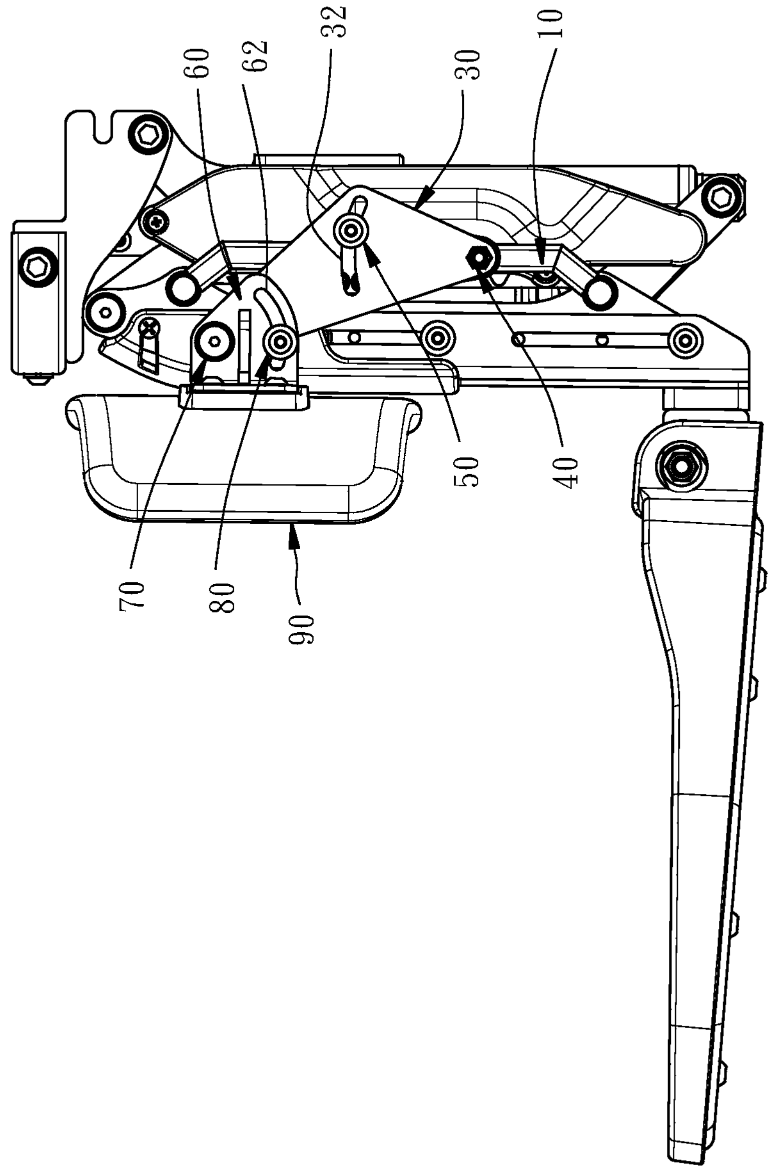
FIG. 2 is a front view of the preferred embodiment of the present invention.
Figure 3:
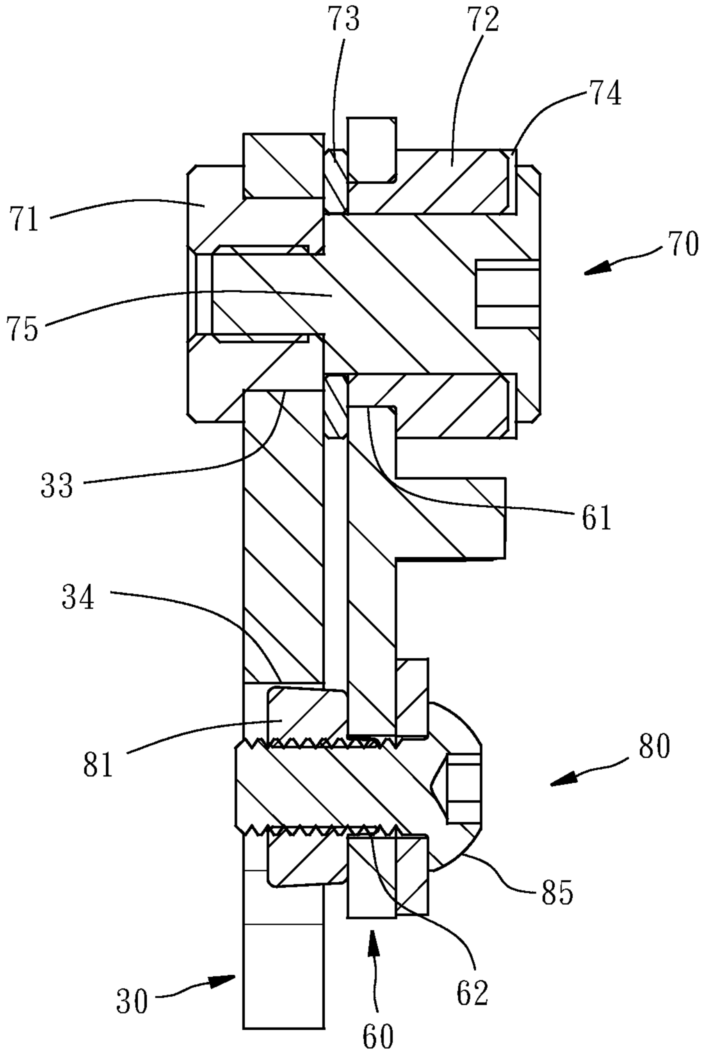
FIG. 3 is a partially sectional view of FIG. 2.
Figure 4:
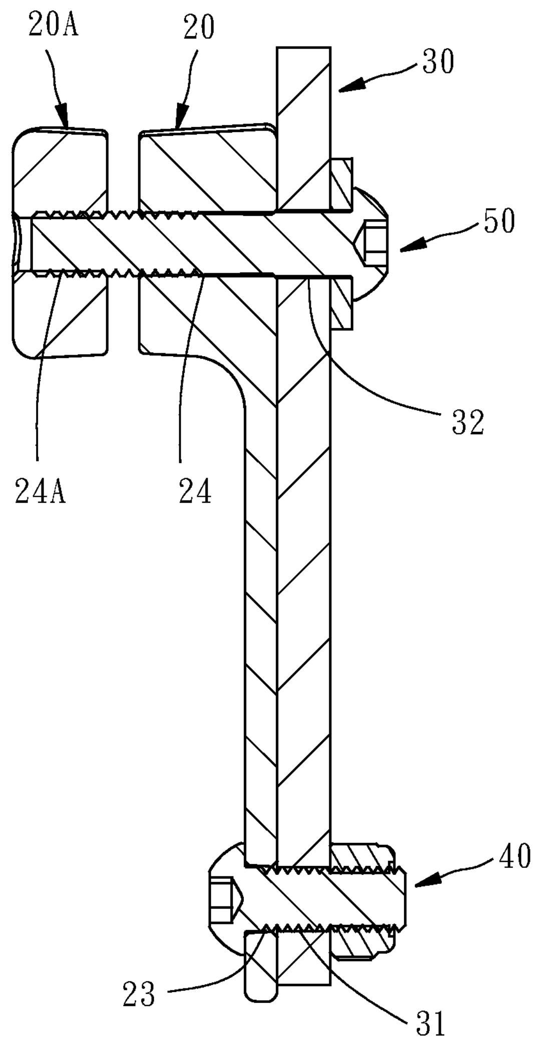
FIG. 4 is another partially sectional view of FIG. 2
Figure 5:
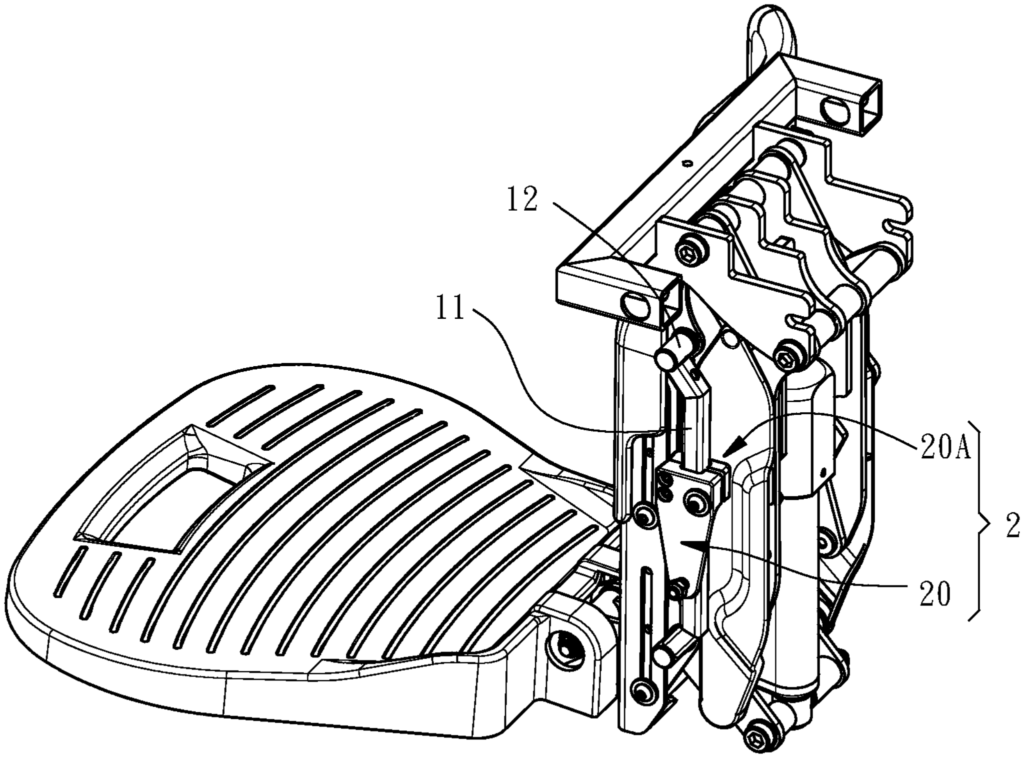
FIG. 5 a perspective view of the preferred embodiment of the present invention, in which a part of components are eliminated.
Figure 6:
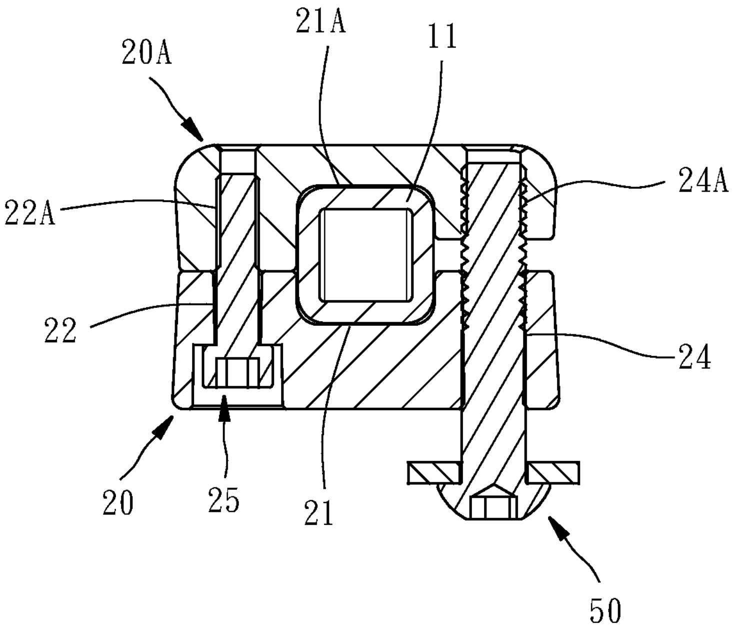
FIG. 6 is a partially sectional view of FIG. 5.
Figure 7:
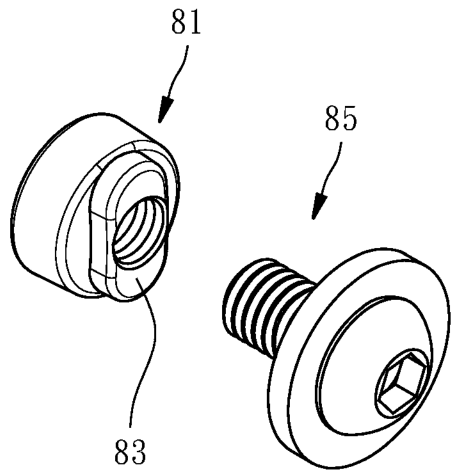
FIG. 7 is an exploded view of the preferred embodiment of the present invention.

Referring to FIGS. 1 to 7, a calf rest and support structure 1 of a wheelchair of the present invention comprises a rail 10, an adjusting and moving set 2, a first swing member 30, a first pivot set 40, a lock bolt 50, a second swing member 60, a second pivot set 70, a stop wheel 80, and a calf support member 90.

The rail 10 is mounted to a leg lifting mechanism T of the wheelchair. The rail 10 has a strip portion 11 and two fixed portions 12 located at two ends of the strip portion 11 and screwed to the leg lifting mechanism T.

The adjusting and moving set 2 is movably disposed to the rail 10.

The adjusting and moving set 2 has a first clamping and moving member 20 and a second clamping and moving member 20A.

The first clamping and moving member 20 and the second clamping and moving member 20A are clamped on the rail 10 and moved along the rail 10.

The first clamping and moving member 20 has a first slide groove 21 slidably disposed to the rail 10. The second clamping and moving member 20A has a second slide groove 21A slidably disposed to the rail 10. The first slide groove 21 is sleeved on the strip portion 11 of the rail 10. The second slide groove 21A is sleeved on the strip portion 11 of the rail 10.

The first clamping and moving member 20 has two first fixed holes 22. The second clamping and moving member 20A has two second fixed holes 22A. Two bolts 25 are penetrated through the first fixed holes 22 and threaded with the second fixed holes 22A, such that the first clamping and moving member 20 and the second clamping and moving member 20A are fixed to the rail 10.

The first clamping and moving member 20 has a first pivot hole 23 and a fixed through hole 24. In this embodiment, the fixed through hole 24 is located above the first pivot hole 23.

The second clamping and moving member 20A has a fixed threaded hole 24A coaxially corresponding to the fixed through hole 24.

The first swing member 30 is pivotally connected with the adjusting and moving set 2.

The first swing member 30 has a second pivot hole 31, a first curved groove 32, a third pivot hole 33, and a wheel stop recess 34.

The first curved groove 32 is formed with a center of the second pivot hole 31 as a circle center.

The first pivot set 40 is pivotally connected with the adjusting and moving set 2 and the first swing member 30, and has a bolt and a nut.

The first pivot set 40 pivotally passes through the first pivot hole 23 of the first clamping and moving member 20 and the second pivot hole 31 of the first swing member 30.

The lock bolt 50 is penetrated through the first curved groove 32 of the first swing member 30 and the fixed through hole 24 of the first clamping and moving member 20 so as to lock the first clamping and moving member 20 and the first swing member 30 together.

In this embodiment, the first pivot set 40 is located under the lock blot 50 in order to adjust more displacement range and make full use of space.

The second swing member 60 is pivotally connected with the first swing member 30 so as to be swung relative to the first swing member 30.

The second swing member 60 has a fourth pivot hole 61 and a second curved groove 62 formed with a center of the fourth pivot hole 61 as a circle center.

Further, the second swing member 60 has a calf support member connecting board 65 and a plurality of elongated holes 66 provided at the calf support member connecting board 65.

The second pivot set 70 is pivotally connected with the second swing member 60 and the first swing member 30. The second pivot set 70 has a first pivot barrel 71, a second pivot barrel 72, a first washer 73, a second washer 74, and a socket bolt 75.

The first pivot barrel 71 is pivotally connected with the third pivot hole 33. The second pivot barrel 72 is pivotally connected with the fourth pivot hole 61. The first washer 73 is located between the first and second pivot barrels 71, 72. The second washer 74 is located at an end portion of the second pivot barrel 72. The socket bolt 75 is threaded with the first pivot barrel 71. The second washer 74 is pressed by the socket bolt 75.

In this embodiment, the first swing member 30 and the second swing member 60 also press against the first washer 73.

The stop wheel 80 is disposed to the second curved groove 62 of the second swing member 60. The stop wheel 80 has a rest body 81, a curved block 83, and a rest lock bolt 85. The curved block 83 is received in the second curved groove 62. The rest lock bolt 85 is threaded with a threaded hole of the rest body 81 to fix the stop wheel 80 to the second swing member 60.

The rest body 81 correspondingly leans against the wheel stop recess 34 of the first swing member 30. The curved block 83 is disposed to the second curved groove 62 of the second swing member 60.

In this embodiment, the second pivot set 70 is located above the stop wheel 80 for allowing the second swing member 60 to be swung to a position by gravity.

The calf support member 90 is fixed to the second swing member 60.

The calf support member 90 has a fixed board portion 95 connected with the second swing member 60. The elongated hole 66 of the second swing member 60 is used to adjust and fix the calf support member 90 in different positions.

Figure 8:
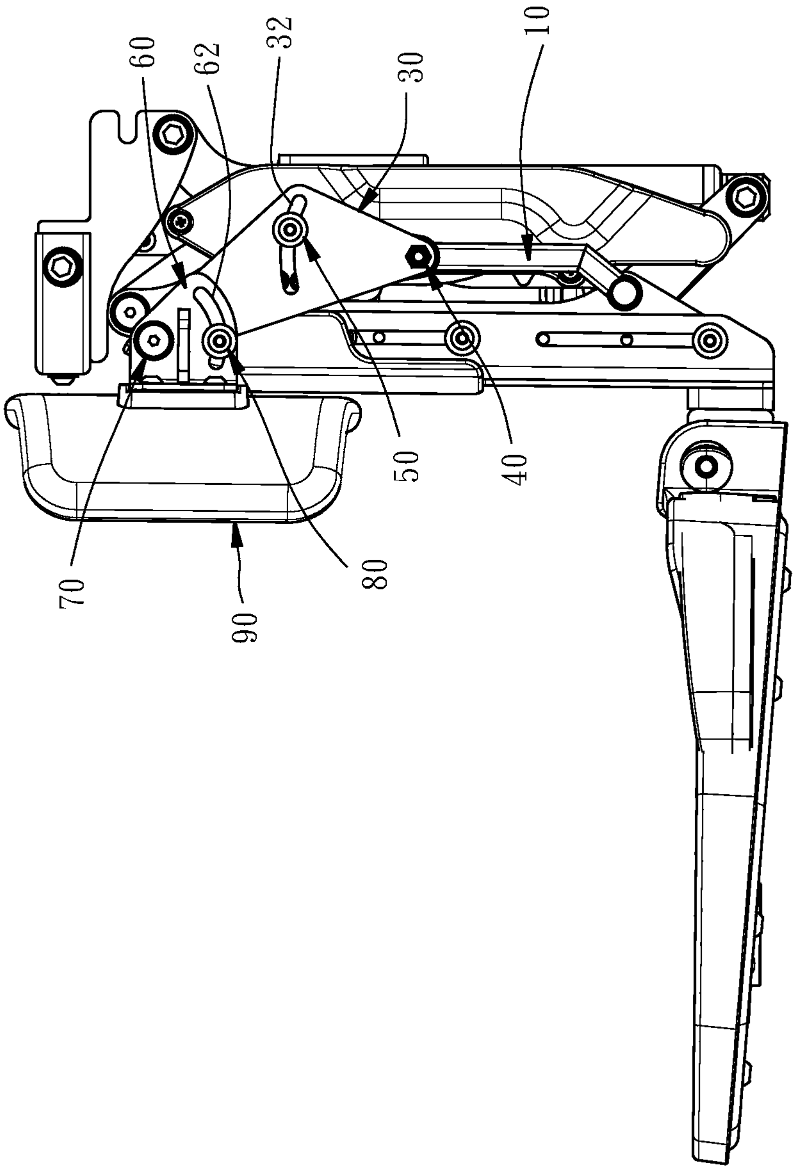
FIG. 8 is a front view of the preferred embodiment of the present invention, showing that the calf support member is in another state.

FIG. 8 shows that the calf support member 90 is in another state.

Figure 9:
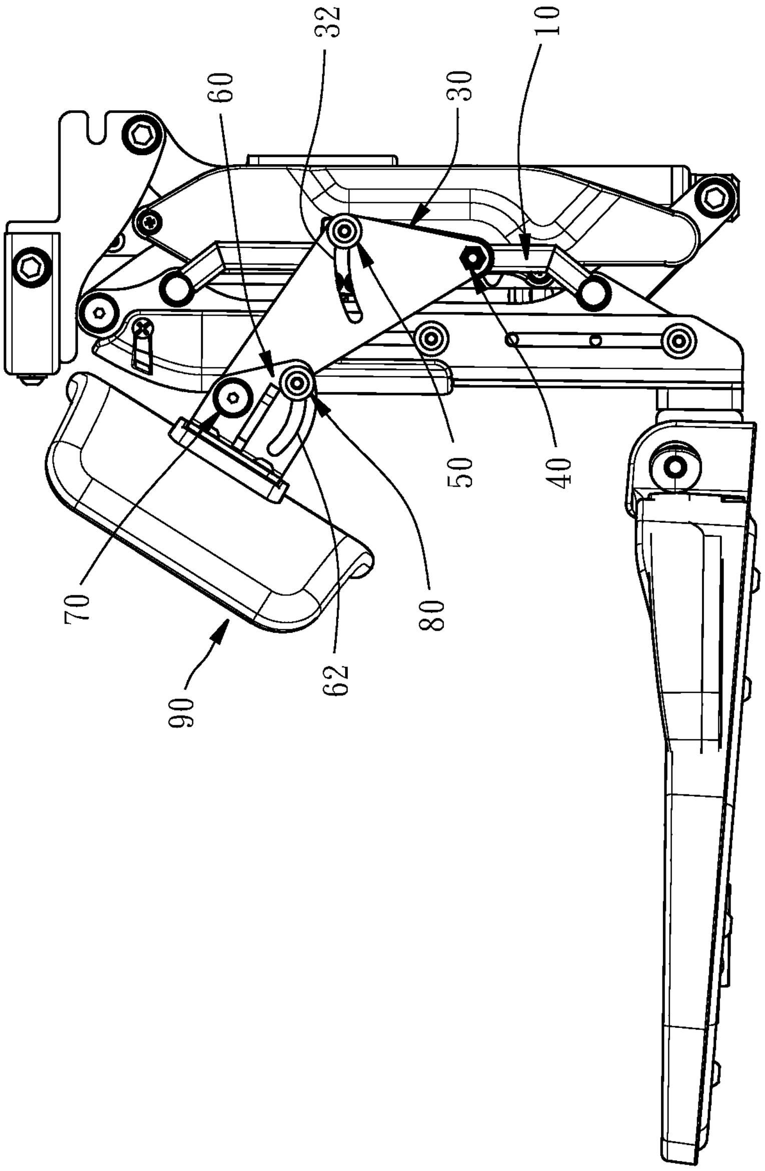
FIG. 9 is a front view of the preferred embodiment of the present invention, showing that the calf support member is in another state.

FIG. 9 shows that the calf support member 90 is in another state.

Figure 10:
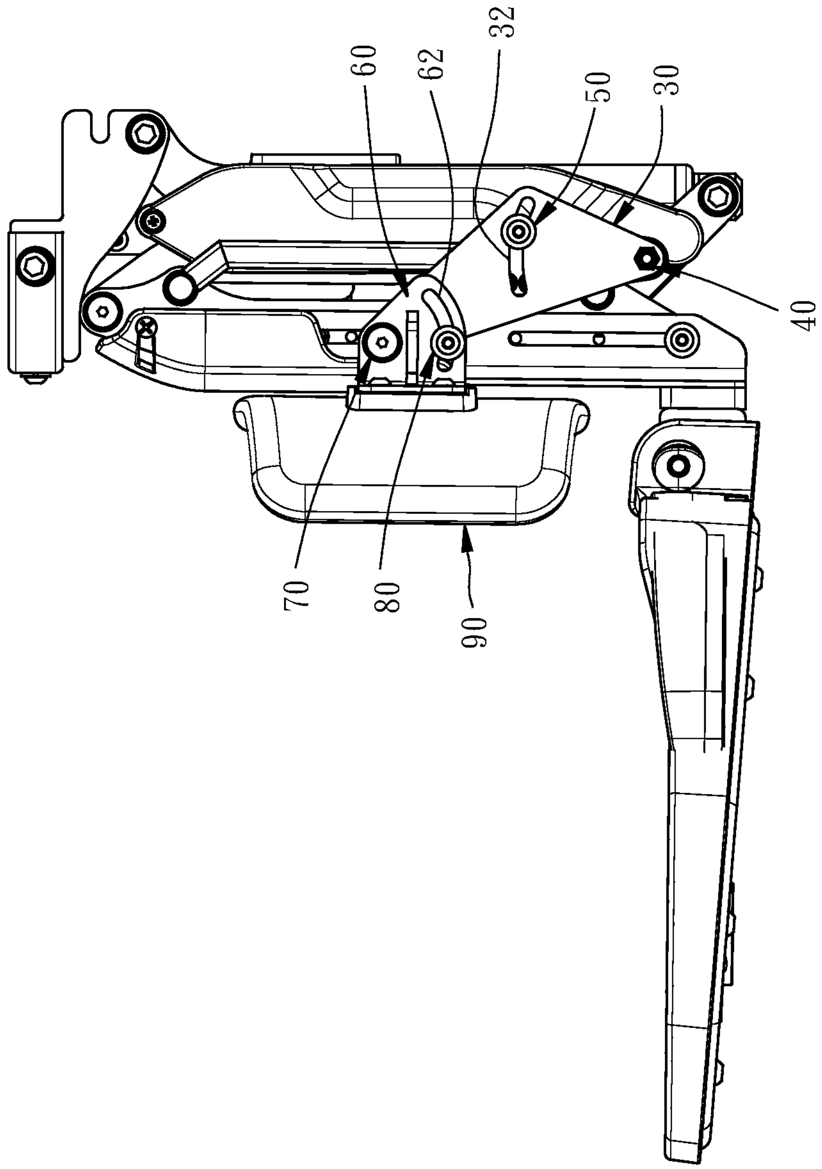
FIG. 10 is a front view of the preferred embodiment of the present invention, showing that the calf support member is in another state.

FIG. 10 shows that the calf support member 90 is in another state.

Figure 11:
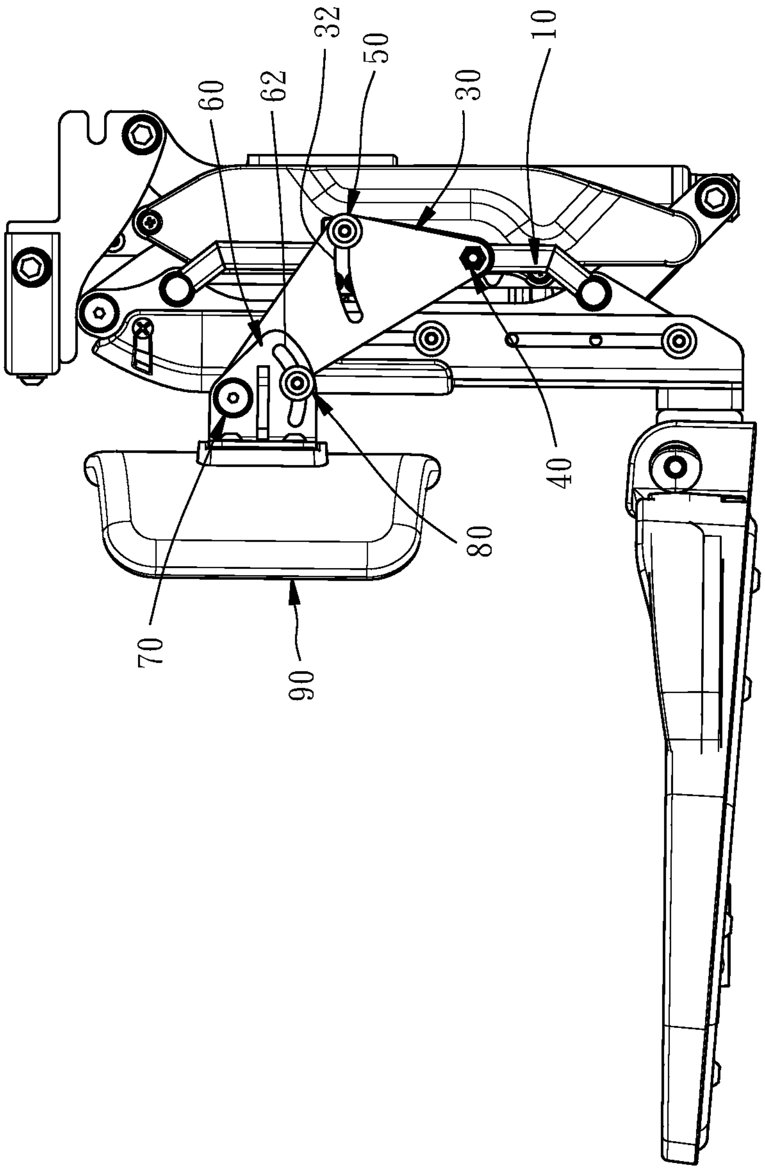
FIG. 11 is a front view of the preferred embodiment of the present invention, showing that the calf support member is in another state.

FIG. 11 shows that the calf support member 90 is in another state.

Figure 12:
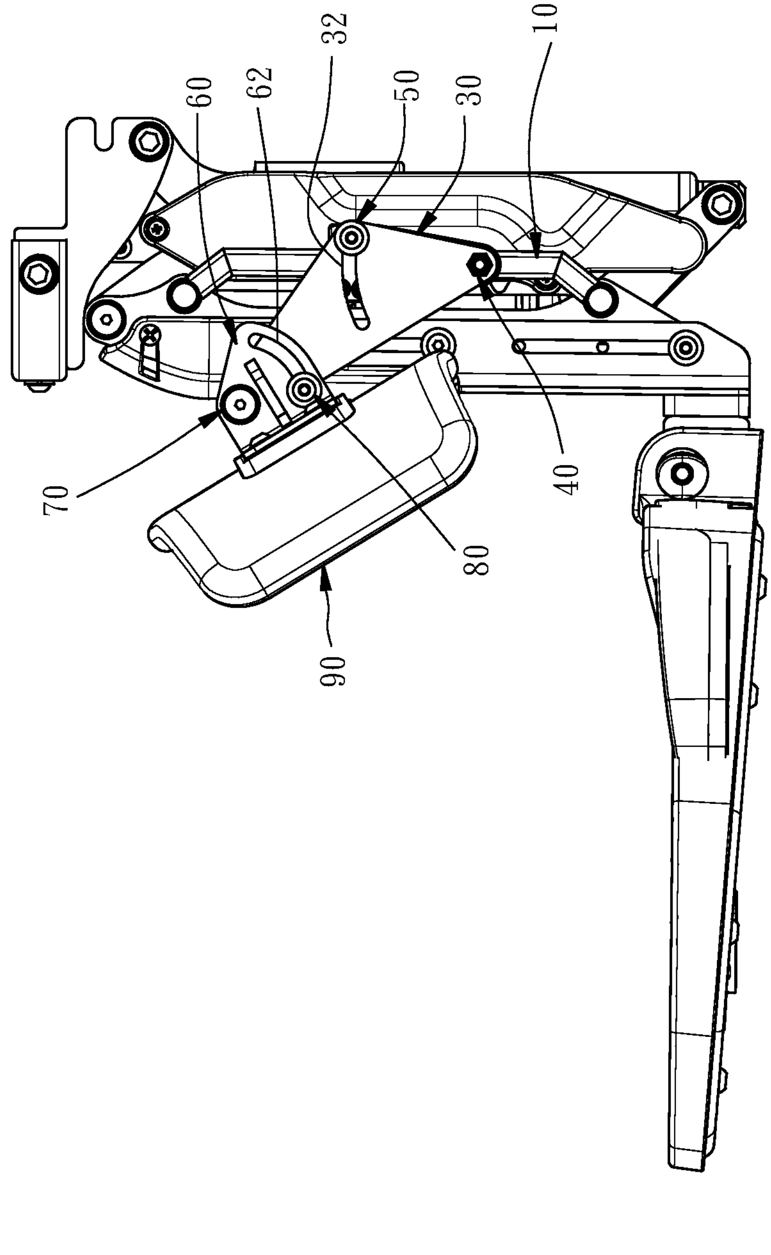
FIG. 12 is a front view of the preferred embodiment of the present invention, showing that the calf support member is in another state.

FIG. 12 shows that the calf support member 90 is in another state.

Figure 13:
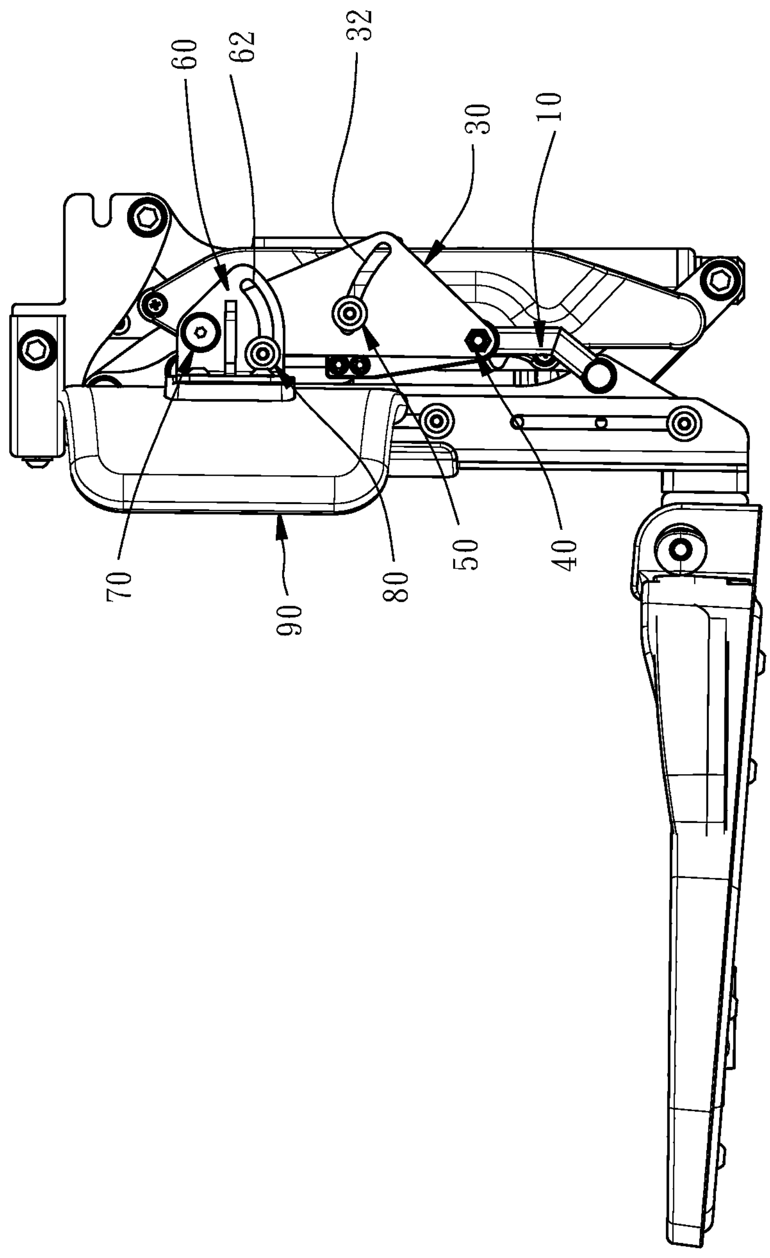
FIG. 13 is a front view of the preferred embodiment of the present invention, showing that the calf support member is in another state.

FIG. 13 shows that the calf support member 90 is in another state.

By means of dual pivot adjustment of the first and second swing members 30, 60, the effects of conveniently adjusting position and angle, easily moving and swinging, and enhancing convenience of adjustment and use can be achieved.

The rail 10 allows the calf rest and support structure 1 to be directly assembled with or disassembled from the wheelchair.

In addition, the adjusting and moving set 2 is combined by the first and second clamping and moving members 20, 20A so as to be conveniently assembled and easily adjusted.

Further, the curved block 83 of the stop wheel 80 provides an anti-rotation function when locked for facilitating adjusting position conveniently.

Moreover, the second pivot set 70 is pivotally connected with the second swing member 60 and the first swing member 30. The second pivot set 70 has a first pivot barrel 71, a second pivot barrel 72, a first washer 73, a second washer 74, and a socket bolt 75. The second pivot set 70 is configured to facilitate assembly, allow swinging of the second swing member 60, and adjust tightness as desired.

In addition to the aforesaid embodiment, the present invention can be changed as following:

For example, the adjusting and moving set 2 is not limited to a combined structure of the first and second clamping and moving members 20, 20A, but can also be a one-piece structure.

Probably, the second swing member 60 and the stop wheel 80 are not limited to be a one-piece component or separate component.

Probably, the pivot sets are not limited to be pivot sets that are separated as described or the pivot sets that are integrally connected with the components.

Probably, the first swing member 30 is not limited to be set at the bottom, but can also be set at the top; the second swing member 60 is not limited to be set at the top, but can also be set at the bottom.

As indicated above, the calf rest and support structure 1 of the present invention uses the swing adjustment design to conveniently adjust position and angle, easily move and swing, and enhance convenience of adjustment and use, thereby achieving the purpose of the present invention.

What is claimed is:

1. A calf rest and support structure of a wheelchair, comprising:

a rail;

an adjusting and moving set movably disposed to the rail;

a first swing member pivotally connected with the adjusting and moving set and having a first curved groove and a third pivot hole;

a lock bolt secured to the adjusting and moving set through the first curved groove of the first swing member;

a second swing member pivotally connected with the third pivot hole of the first swing member so as to be swung relative to the first swing member; and a calf support member fixed to the second swing member.

2. The calf rest and support structure of the wheelchair as claimed in claim 1, further comprising a stop wheel disposed to the second swing member for rest of the first swing member.

3. The calf rest and support structure of the wheelchair as claimed in claim 2, wherein the first swing member has a wheel stop recess; the stop wheel leans against the wheel stop recess.

4. The calf rest and support structure of the wheelchair as claimed in claim 2, wherein the second swing member has a fourth pivot hole and a second curved groove formed with a center of the fourth pivot hole as a circle center, the fourth pivot hole pivotally connected with the third pivot hole; the stop wheel is disposed to the second curved groove of the second swing member.

5. The calf rest and support structure of the wheelchair as claimed in claim 1, wherein the adjusting and moving set has a first clamping and moving member and a second clamping and moving member; the first and second clamping and moving members are clamped on the rail and moved along the rail.

6. The calf rest and support structure of the wheelchair as claimed in claim 5, wherein the first clamping and moving member has a first slide groove slidably disposed to the rail; the second clamping and moving member has a second slide groove slidably disposed to the rail.

7. The calf rest and support structure of the wheelchair as claimed in claim 5, wherein the first clamping and moving member and the first swing member are secured together by the lock bolt penetrated through the first curved groove of the first swing member and a fixed through hole of the first clamping and moving member, and threaded with a fixed threaded hole of the second clamping and moving member.

8. The calf rest and support structure of the wheelchair as claimed in claim 1, wherein the calf support member has a fixed board portion connected with the second swing member.

9. The calf rest and support structure of the wheelchair as claimed in claim 1, wherein the second swing member has an elongated hole for adjusting and fixing the calf support member in different positions.

10. The calf rest and support structure of the wheelchair as claimed in claim 1, further comprising a second pivot set pivotally connected with the first and second swing members, the second swing member having a fourth pivot hole; the second pivot set has a first pivot barrel pivotally connected with the third pivot hole, a second pivot barrel connected with the fourth pivot hole, a first washer located between the first and second pivot barrels, a second washer located at an end portion of the second pivot barrel, and a socket bolt threaded with the first pivot barrel.

* * * * *